2,961,427
AROMATIC POLYESTERS AND PROCESS OF MAKING SAME

Henry A. Walter, Longmeadow, Mass., assignor to Monsanto Chemical Company, St. Louis, Mo., a corporation of Delaware No Drawing. Filed Jan. 2, 1958, Ser. No. 706,584

4 Claims. (Cl. 260—47)

This invention relates to new linear polyesters and processes for preparing them. More particularly, the invention relates to linear polyesters formed from bisphenols.

One object of this invention is to provide new linear polyesters comprising bisphenol condensation products. Another object is to provide a process for making these polyesters.

These and other objects are attained by reacting a bisphenol with a polymeric anhydride of a dicarboxylic acid or with a dialkanoic mixed anhydride of a dicarboxylic acid and a lower alkanoic acid at temperatures of 135–250° C.

The following examples are given to illustrate the invention. Parts mentioned are parts by weight.

Example I

A stream of ketene is passed through a dispersion of 65 parts of adipic acid in 175 parts of acetone at room temperature at a rate of 8 parts/hour for about 4.5 hours until all of the adipic acid has been dissolved. The reaction mixture is then heated to evaporate acetone, decompose the mixed diacetic adipic anhydride, and distill off acetic anhydride, leaving a polymer of adipic anhydride as a residue. A mixture of this residue and 100 parts of 2,2-bis(p-hydroxyphenyl) propane is slowly heated to 220° C., and vacuum is applied to remove water to complete formation of the polyester. The polyester product may be extruded into films or spun into fibers having high heat resistance.

Example II

A stream of ketene is passed through a dispersion of 65 parts of adipic acid in 175 parts of acetone at room temperature at a rate of 8 parts/hour for about 4.5 hours until all of the adipic acid has been dissolved. A mixture of this solution and 100 parts of 2,2-bis (p-hydroxyphenyl) propane is slowly heated to about 220° C. to remove acetone and acetic acid. The residue is a polymeric ester which may be extruded into films or spun into fibers having high heat resistance.

Example III

A stream of ketene is passed through a dispersion of 40 parts of anhydrous oxalic acid in 175 parts of acetone at room temperature at a rate of 8 parts/hour until no more ketene is consumed. A mixture of this solution and 100 parts of 2,2-bis (p-hydroxyphenyl) propane is slowly heated to 220° C. Acetone and acetic acid evaporate from the reaction mixture, leaving a residue consisting of a polyester of the oxalic acid and 2,2-bis (p-hydroxyphenyl) propane. Fibers and films formed from this product are characterized by unusual resistance to ultraviolet light and stability against oxidation.

Example IV

Diacetic fumaric mixed anhydride, prepared by reacting ketene with fumaric acid, is crystallized from acetone solution, and 90 parts of the dry product are triturated with 100 parts of 2,2-bis (p-hydroxyphenyl) propane. The dry powder is heated to 220–230° C. to form a polyester of fumaric acid and 2,2-bis (p-hydroxyphenyl) propane. Most of the acetic acid formed by the reaction is evaporated, and vacuum is applied to remove the remainder. The polyester product is a glassy resin which can be drawn into long fibers.

The bisphenols which are reacted with anhydrides to form the polyesters of this invention are aromatic compounds having two p-hydroxyphenyl groups attached to a carbon atom of an alkane, cycloalkane, or aralkane. Suitable bisphenols include bis (p-hydroxyphenyl) methane, 1,1-bis (p-hydroxyphenyl) ethane, 2,2-bis (p-hydroxyphenyl) propane, 2,2-bis (p-hydroxyphenyl) octane, 1,1-bis (p-hydroxyphenyl) cyclohexane, bis (p-hydroxyphenyl) phenylmethane, bis (p-hydroxyphenyl) methylphenylmethane, etc. Preferably, the reaction mixture contains the bisphenol and anhydride in equimolar ratios.

The anhydrides with which the bisphenols are reacted are either polymeric anhydrides of dicarboxylic acids or mixed anhydrides of dicarboxylic acids and acetic, propionic or butyric acids. The anhydrides are derived from dicarboxylic acids, e.g., fumaric, sebacic, suberic, pimelic, adipic, glutaric, succinic, malonic, and oxalic acids, isomers and homologs thereof, such as methyl and dimethyl glutaric acids, and acids corresponding to the general formulas:

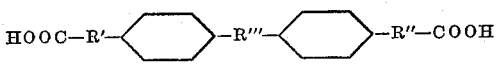

wherein R', R", and R''' represent $(CH_2)_n$, and $n$ is an integer from 0–10. With the exception of oxalic acid, dicarboxylic acids capable of forming inner anhydrides are inoperable in this invention. The mixed anhydrides may be prepared by reacting ketene, methyl ketene, or ethyl ketene with the dicarboxylic acid at room temperature in an organic solvent inert to the reaction. Suitable solvents include ethers, such as diethyl ether, tetrahydrofurane, etc., ketones, such as acetone, methyl ethyl ketone, acetophenone, etc. The mixed anhydrides may also be prepared by reacting the dicarboxylic acid with anhydrides of acetic, propionic or butyric acids. The products formed by these reactions are dialkanoic mixed anhydrides of the dicarboxylic acid and acetic, propionic, or butyric acid. They may be reacted with the bisphenols per se, or they may be heated to decompose the mixed anhydride, thus simultaneously releasing acetic, propionic, or butyric anhydride and forming a polymeric dicarboxylic acid anhydride which may be reacted with the bisphenols.

Reaction between the bisphenols and anhydrides is accomplished by heating a mixture of the reactants at 135–250° C. for about 30–120 minutes in the presence or absence of an inert organic solvent, e.g., an ether, such as diethyl ether, tetrahydrofurane, etc., ketone, such as acetone, methyl ethyl ketone, acetophenone, etc. Anhydrous conditions being desirable for the reaction, any water present in the initial reaction mixture or formed during the course of the reaction is preferably removed, e.g., by bringing the reaction mixture to a temperature sufficiently high to evaporate the water or by incorporating into the reaction mixture a material such as acetic anhydride which will react with water to form a low-boiling product which may be evaporated from the mixture. The reaction between the bisphenols and anhydrides may be conducted in an inert atmosphere when it is desirable to prevent discoloration of the product. If desired, vacuum may be applied after completion of the reaction to remove water, solvent, and lower alkanoic anhydride not already removed by evaporation.

In addition to its utility in making the particular products of this invention, the process of this invention has been found applicable to the formation of linear polyesters from derivatives of bisphenols and polymeric dicarboxylic acid anhydrides or mixed dialkanoic dicarboxylic acid anhydrides. Among the bisphenol derivatives which may be used as reactants in this process are hydrogenated derivatives comprising alicyclic hydroxy compounds, such as 2,2-bis (4-hydroxyclclohexyl) propane, and ring-halogenated bisphenols, such as 2,2-bis (2,3,5,6-tetrachloro-4-hydroxyphenyl) propane.

The products of this invention are linear polyesters formed from bisphenols and polymeric dicarboxylic acid anhydrides or mixed dialkanoic dicarboxylic acid anhydrides. Their molecular weights vary with variations in the reactants and the reaction conditions, but the preferred products have average molecular weights in the range of 25,000–75,000. They are useful in the formation of flexible pellicles, films, and fibers and are particularly useful in the formation of coating compositions wherein they may constitute the sole film-forming material or may be used in combination with other film-forming materials such as alkyd resins, etherified melamine- or urea-formaldehyde resins, epoxy resins, etc.

The specification, particularly in the examples, is illustrative of the invention and not intended as a limitation thereof. It is obvious that many variations may be made within the spirit and scope of this invention.

What is claimed is:

1. A process for preparing a linear polyester resin which comprises reacting a dihydroxy compound with an anhydride at 135–250° C., said dihydroxy compound being a member of the group consisting of bis (p-hydroxyphenyl) methane, 1,1-bis (p-hydroxyphenyl) ethane, 2,2-bis (p-hydroxyphenyl) propane, 2,2-bis (p-hydroxyphenyl) octane, 1,1-bis (p-hydroxyphenyl) cyclohexane, bis (p-hydroxyphenyl) phenylmethane, bis (p-hydroxyphenyl) methylphenylmethane, 2,2-bis (4-hydroxycyclohexyl) propane, and 2,2-bis (2,3,5,6-tetrachloro-4-hydroxyphenyl) propane, said anhydride being a mixed anhydride of a saturated aliphatic monocarboxylic acid containing 2–4 carbon atoms and a dicarboxylic acid of the group consisting of fumaric, sebacic, suberic, pimelic, adipic, glutaric, succinic, malonic, and oxalic acids, said mixed anhydride containing two monocarboxylic acid moieties and one dicarboxylic acid moiety.

2. A process as in claim 1 wherein the mixed anhydride is prepared by reacting a ketene of the group consisting of ketene, methyl ketene, and ethyl ketene with the dicarboxylic acid at room temperature.

3. A process as in claim 1 wherein the dihydroxy compound is 2,2-bis (p-hydroxyphenyl) propane.

4. A process as in claim 2 wherein the dihydroxy compound is 2,2-bis (p-hydroxyphenyl) propane, the ketene is ketene, and the dicarboxylic acid is adipic acid.

References Cited in the file of this patent

UNITED STATES PATENTS 2,595,343   Drewitt _____ May 6, 1952